United States Patent
> D'Amico et al.

[15] 3,668,254
[45] June 6, 1972

[54] N-HALOALLYL-P-PHENYLENEDIAMINES

[72] Inventors: John J. D'Amico, Akron; Sidney T. Webster, Worthington, both of Ohio

[73] Assignee: Monsanto Company, St. Louis, Mo.

[22] Filed: Mar. 20, 1970

[21] Appl. No.: 21,542

[52] U.S. Cl. ..........................260/576, 260/45.9 R, 260/809
[51] Int. Cl. .............................................C07c 87/48
[58] Field of Search..................................260/576

[56] References Cited

UNITED STATES PATENTS 2,115,473  4/1938  Semon..............................260/45.9 X
2,901,459  8/1959  Merrifield..........................260/45.9
3,211,793  10/1965  Roos..................................260/576 X Primary Examiner—Joseph Rebold
Assistant Examiner—C. F. Warren
Attorney—Richard O. Zerbe, J. E. Maurer and Neal E. Willis

[57] ABSTRACT

A para-phenylenediamine of the formula

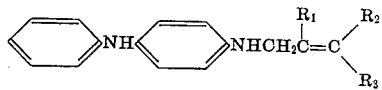

wherein $R_1$, $R_2$ and $R_3$ are hydrogen or halogen, at least one being halogen, useful for the preservation of rubber.

3 Claims, No Drawings

N-HALOALLYL-P-PHENYLENEDIAMINES

This invention relates to p-phenylenediamines and their use as antidegradants. More particularly this invention pertains to N-haloallyl-N'-phenyl-p-phenylenediamines.

BACKGROUND OF THE INVENTION

N-Phenyl-para-phenylenediamines are used extensively as antidegradants in the rubber industry. They are particularly important in protecting rubber from attack from ozone, especially when the rubber article is flexed while in use. Many N-substituted N'-phenyl-p-phenylenediamines have been prepared and tested including N-alkyl-, N-alkenyl-, N-aralkyl-, N-aryl- and N-alkaryl-N'-phenyl-p-phenylenediamines. The N-alkyl-N'-phenyl-p-phenylenediamines are used extensively because of their exceptionally high antiozonant activity, although they do reduce processing safety by activating cure. N-alkenyl-N'-phenyl-p-phenylenediamines are, in general, less effective antiozonants and similarly cure activating. An improved class of N-alkenyl-N'-phenyl-p-phenylenediamines has now been found.

SUMMARY OF THE INVENTION

We have discovered that the presence of halogen on one or both carbons of the ethenically unsaturated bond of N-alkenyl-N'-phenyl-p-phenylenediamine enhances antiozonant activity. The presence of a halogen atom on carbon of the double bond results in enhanced antiozonant activity coupled with reduced affect on cure. Thus, there has been discovered a new and improved class of N-alkenyl-N'-phenyl-p-phenylenediamines of the formula

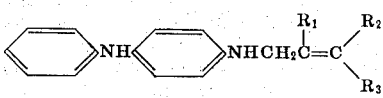

wherein $R_1$, $R_2$ and $R_3$ are hydrogen or halogen, at least one being halogen. The halogen may be selected from the group consisting of chlorine, bromine, iodine or fluorine or mixtures thereof. The mono-chloro compounds are preferred.

The N-haloallyl-N'-phenyl-p-phenylenediamines may be prepared by the condensation of a polyhalopropene with 4-aminodiphenylamine in the presence of an acid acceptor.

Examples of suitable polyhalopropene reactants are 1,3-dichloropropene, 2,3-dichloropropene, 1,2,3-trichloropropene, 1,1,2,3-tetrachloropropene and their bromo and iodo counterparts or mixed halopropenes, such as 1-chloro-3-bromopropene, 2-chloro-3-bromopropene, 1,2-dichloro-3-bromopropene, 1,1,2-trichloro-3-bromopropene and the like.

Illustrative examples of the compounds of this invention are N-(2-chloroallyl)-N'-phenyl-p-phenylenediamine, N-(2-bromoallyl)-N'-phenyl-p-phenylenediamine, N-(2-iodoallyl)-N'-phenyl-p-phenylenediamine, N-(2-fluoroallyl)-N'-phenyl-p-phenylenediamine, N-(3-chloroallyl)-N'-phenyl-p-phenylenediamine, N-(3-bromoallyl)-N'-phenyl-p-phenylenediamine, N-(2,3-dichloroallyl)-N'-phenyl-p-phenylenediamine, N-(2,3-diiodoallyl)-N'-phenyl-p-phenylenediamine, N-(3,3-dichloroallyl)-N'-phenyl-p-phenylenediamine, N-(3,3-difluoroallyl)-N'-phenyl-p-phenylenediamine, N-(2,3,3-trichloroallyl)-N'-phenyl-p-phenylenediamine, N-(2,3,3-tribromoallyl)-N'-phenyl-p-phenylenediamine, N-(3-bromo-2-chloroallyl)-N'-phenyl-p-phenylenediamine, and N-(3-chloro-2-bromoallyl)-N'-phenyl-p-phenylenediamine.

The N-(haloallyl)-N'-phenyl-p-phenylenediamines protect rubber from the degradation caused by the deleterious effects of ozone. Protection is obtained by incorporating an antiozonant amount of the material into the rubber composition preferably before vulcanization and the protection continues after vulcanization. The compounds effectively inhibit ozone attack of sulfur vulcanizable rubbers such as natural rubber and synthetic diene rubbers. The diene rubbers contain sufficient unsaturation that they can be vulcanized with sulfur or sulfur containing compounds. Synthetic diene rubbers which are protected include polymers of 1,3-butadiene, of isoprene or mixtures of the two polymers, copolymers of 1,3-butadienes with other monomers, for example, styrene, acrylonitrile, isobutylene or methyl methacrylate and polyolefin rubbers such as ethylenepropylene terpolymers (EPDM).

The amount of antiozonant used depends on a number of factors such as type of elastomer, end use of the vulcanized product and other components in the formulation. The amount is usually between 0.1 to 5 parts by weight per 100 parts by weight rubber. Generally, the amount is between 0.5 to 2 parts by weight antiozonant.

DESCRIPTION OF THE PREFERRED EMBODIMENTS

N-(2-Chloroallyl)-N'-phenyl-p-phenylenediamine is prepared as follows: To a stirred mixture of 184.2 g. (1.0 mole) of 4-aminodiphenylamine and 121.5 g. (1.2 mole) of triethylamine at 85° C. is added 113.2 g. (1.02 mole) of 2,3-dichloropropene while the temperature is maintained between 80°–90° C. The mixture is heated to 110° C. in 25 minutes and refluxed between 110°–129° C. for 2.5 hours during which time salt formation is observed. The mixture is cooled to 110° C., and 225 g. (1.4 mole) of 25 percent NaOH solution is added after which 250 ml. of water is added to dissolve the salt which formed. The reaction mixture separates into two phases of which the organic phase is recovered and the water phase discarded. Low boiling constituents are removed from the organic phase by heating in vacuo up to 205° C. at 1.0–1.5 mm. Hg. The residue is distilled to give 99.5 grams of N-(2-chloroallyl)-N'-phenyl-p-phenylenediamine, b.p. 188°–198° C. at <0.5 mm (mainly 194°–195° C. at <0.5 mm.). Recrystallized from heptane, the product is a white solid which melts at 56°–57.5° C. Analysis gives 10.48 percent N and 13.57 percent Cl compared to 10.83 percent N and 13.70 percent Cl calculated from $C_{15}H_{15}N_2Cl$.

N-(3-Chloroallyl)-N'-phenyl-p-phenylenediamine is prepared by following the above procedure except 1,3-dichloropropene is used in place of 2,3-dichloropropene. N-(2,3-dichloroallyl)-N'-phenyl-p-phenylenediamine is prepared in like manner by using 1,2,3-trichloropropene as the reactant in place of 2,3-dichloropropene.

To illustrate the antiozonant activity of the compounds of this invention, various rubber stocks are prepared. For all the rubber stocks described as illustrative of the invention, Mooney scorch times at 135° C. are determined by means of a Mooney Plastometer. The times in minutes ($t_5$) required for the Mooney reading to rise 5 points above the minimum viscosity is recorded. Longer times are indicative of greater processing safety. The stocks are cured for the length of time required to obtain the optimum cure. Curing characteristics are determined by means of the Monsanto Oscillating Disc Rheometer. From the Rheometer data the time to optimum cure is determined and the stocks are cured in a press for that time. The cure temperature is 144° C. in the case of natural rubber stocks; and 153° C. in the case of synthetic rubber stocks.

Natural rubber stocks and their properties are shown in Table I.

TABLE I

| Ingredient | Stock A | Parts by Weight Stock B | Stock C |
|---|---|---|---|
| Natural rubber (smoked sheets) | 100.0 | 100.0 | 100.0 |
| High abrasion furnace black | 50.0 | 50.0 | 50.0 |
| Sulfur | 2.5 | 2.5 | 2.5 |
| N-tert-butyl-2-benzothiazolesulfenamide | 0.5 | 0.5 | 0.5 |

| | | | |
|---|---|---|---|
| Zinc oxide | 5.0 | 5.0 | 5.0 |
| Stearic acid | 3.0 | 3.0 | 3.0 |
| Hydrocarbon softener | 3.0 | 3.0 | 3.0 |
| N-(Allyl)-N-'-phenyl-p-phenylenediamine | — | 1.5 | — |
| N-(2-Chloroallyl)-N'-phenyl-p-phenylenediamine | — | — | 1.5 |
| Mooney scorch times (t₅) | 13.0 | 6.8 | 11.6 |
| Modulus at 300% elongation | 2550 | 2430 | 2460 |
| Ultimate tensile strength | 3500 | 3800 | 3800 |

Stock A is a control having no antidegradant, Stock B contains an antidegradant having no halo substitutents and Stock C contains a compound of this invention which has a halo substituent. It will be noted that Stock C has 70 percent more processing safety than Stock B.

Rubber ozone resistance data for the vulcanizates of Table I are recorded in Table II. The method used for measuring the ozone damage to vulcanized rubber is described by Decker and Wise, "The Stress Relaxation Method for Measuring Ozone Cracking," Rubber World, Apr. 1962, page 66. The test specimens are placed in an oven where a controlled atmosphere of ozone is maintained. In the static test, the test specimens are held stationary under a given strain. In the dynamic test, the test specimens are flexed repeatedly to a 25 percent strain. The test specimens of rubber are 2 inch long T-50 (ASTM D599–55) pieces died from standard stress-strain test sheets (ASTM D15–57T).

The stress-relaxation method is based on the principle that the effective cross-sectional area of a small test piece of rubber is reduced by ozone cracking. The extent of cracking in a test piece is determined by measuring the forces required to extend the test piece 100 percent before and after exposure to ozone. As the strip begins to crack, the number of stress-supporting rubber chains decreases, and the force required to extend the strip 100 percent is reduced. The ratio of this force to the original force is calculated at various intervals of exposure to ozone. The graph of force vs. time is essentially a straight line, and the time required for attaining 90 percent, 80 percent, and 70 percent of the original force is readily determined from the graph. The ability of the rubber to resist ozone attack is obtained by comparison of these numbers. These ratios are the percent of original modulus of the rubber test piece and are listed as percent retention in the table, infra. The ozone concentration for the tests is 25 parts ozone per hundred million parts of air. Longer times in the data demonstrate better ozone resistance of the rubber stock.

TABLE II

| | Stock | | |
|---|---|---|---|
| | A | B | C |
| | | Hours | |
| Static ozone resistance | | | |
| 90% retention | 2 | 3 | 3 |
| 80% retention | 5 | 8 | 11 |
| 70% retention | 8 | 16 | > |
| Dynamic ozone resistance | | | |
| 90% retention | 2 | 6 | 11 |
| 80% retention | 4 | 14 | 22 |
| 70% retention | 8 | 23 | 40 |

The data show that the vulcanizate containing the compound of this invention is more resistant to ozone degradation. The dynamic ozone resistance data indicate that N-(2-chloroallyl)-N'-phenyl-p-phenylene-diamine is about 75 percent better than N-(allyl)-N'-phenyl-p-phenylenediamine for protecting rubber against ozone degradation when the rubber article is used under dynamic conditions.

Data for styrene-butadiene synthetic rubber stocks, their physical properties, and ozone resistance are shown in Table III.

TABLE III

| | Parts by Weight | | |
|---|---|---|---|
| Ingredient | Stock D | Stock E | Stock F |
| SBR 1500 | 100.0 | 100.0 | 100.0 |
| High abrasion furnace black | 50.0 | 50.0 | 50.0 |
| Sulfur | 1.75 | 1.75 | 1.75 |
| N-tert-butyl-2-benzothiazolesulfenamide | 1.0 | 1.0 | 1.0 |
| Zinc oxide | 4.0 | 4.0 | 4.0 |
| Stearic acid | 2.0 | 2.0 | 2.0 |
| Hydrocarbon softener | 10.0 | 10.0 | 10.0 |
| N-(Allyl)-N'-phenyl-p-phenylenediamine | — | 1.5 | — |
| N-(2-Chloroallyl)-N'-phenyl-p-phenylenediamine | — | — | 1.5 |
| Mooney Scorch times (t₅) | 32.0 | 14.7 | 21.6 |
| Modulus at 300% elongation | 2290 | 1850 | 2050 |
| Ultimate tensile strength | 3400 | 3800 | 3600 |
| Dynamic ozone resistance (hours) | | | |
| 90% retention | 2 | 7 | 10 |
| 80% retention | 3 | 12 | 19 |
| 70% retention | 6 | ≈ | 28 |

The data further demonstrate that N-(2-chloroallyl)-N'-phenyl-p-phenylenediamine has greater processing safety and improved ozone resistance.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A compound of the formula

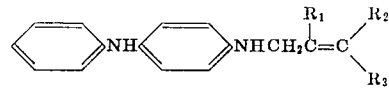

wherein $R_1$, $R_2$ and $R_3$ are hydrogen or identical halogen, at least one being halogen.

2. A compound according to claim 1 wherein the halogen is chlorine.

3. A compound according to claim 2 wherein $R_2$ and $R_3$ are hydrogen.

* * * * *